United States Patent [19]

Schafer

[11] Patent Number: 4,779,346

[45] Date of Patent: Oct. 25, 1988

[54] TRANSPARENT MEASURING DEVICE WITH MULTICOLORED LINES

[76] Inventor: Randal D. Schafer, 15713-35th Ave. W., Lynnwood, Wash. 98037

[21] Appl. No.: 932,311

[22] Filed: Nov. 19, 1986

[51] Int. Cl.⁴ .............................................. B43L 7/00
[52] U.S. Cl. ...................................... 33/1 B; 33/11; 33/494; 33/476
[58] Field of Search ............... 33/1 R, 1 B, 1 C, 1 K, 33/1 N, 483, 494, 11, 15, 12, 17, 2 R, 1 AA, 476; 116/335

[56] References Cited

U.S. PATENT DOCUMENTS

| 647,339 | 4/1900 | Thompson | 33/563 |
| 846,006 | 3/1907 | Bryson | 33/1 B |
| 1,423,019 | 7/1922 | Pogue | 33/1 B |
| 2,095,543 | 10/1937 | Zachs | 33/1 B |

FOREIGN PATENT DOCUMENTS

| 945860 | 12/1948 | France | 33/1 B |
| 2396522 | 3/1979 | France | 33/11 |
| 3990 | of 1885 | United Kingdom | 33/476 |

Primary Examiner—Harry N. Haroian
Attorney, Agent, or Firm—Christensen, O'Connor, Johnson & Kindness

[57] ABSTRACT

A measuring device (10) formed from a rectangular sheet (11) of transparent material having a pattern of composite vertical lines (16) and composite horizontal lines (18) that form squares (20). Each composite line is formed of a first line (24) of a first color and a second line (26) of a second color different than the first color, such that the composite line will be visible against backgrounds of various colors. The first line is preferably of a lesser breadth than the second line, and is superimposed on the second line so that second line is visible on each side of the first line, and either line will be visible against a multicolored background. The composite lines may be consecutively numbered with numbers (28), and single colored angled lines (22) may be provided having markings (32) representing the angle in degrees that each angled line makes with the vertical lines.

12 Claims, 2 Drawing Sheets

TRANSPARENT MEASURING DEVICE WITH MULTICOLORED LINES

TECHNICAL FIELD

This invention relates to measuring devices, and more particularly to a measuring device for measuring, marking, or cutting material of various colors, including multicolored material such as quilting material.

BACKGROUND OF THE INVENTION

Transparent measuring devices are useful for measuring, marking, or creating designs on a background material. The present invention, as it pertains to transparent measuring devices, will be described in the context of the quilting art, although it will be appreciated that it can have application in other fields.

Quilt making is a creative art that combines facbric, color, and pattern design in ways that express individuality and creativity. A quilt is made by joining several layers of fabric together with hand or machine stitching. The stitching can be decorative as well as functional. The fabric layers of a quilt usually consist of a top fabric, a filler, and a backing. The fabric may have a pattern formed from a patchwork of fabric pieces stitched together, an applique attached to the fabric by hand, machine, fusing, or a design drawn or traced on the top fabric that may be highlighted by stitching.

To prevent shifting during the stitching of the pattern, the three layers must be handbasted from the center outward. Small items, generally less than eight (8) inches square, should be basted in a radial pattern along 30° or 45° lines. For larger items a greater pattern should be used with rows no more than four (4) inches apart.

Once basted, the pattern is created on the top fabric. For patchwork, this involves three basic steps—cutting a shape such as a triangle, sewing the triangular shapes to form a square, and sewing the squares to form rows of fabric. It is important that the measuring, cutting, and sewing of the pieces be exact.

There are several disadvantages to using a standard foot-long ruler or a narrow yardstick in making a quilt. First, the marks or lines on transparent rulers are difficult to see when their color blends in with the background color of the fabric, as frequently happens with multicolor quilts. Furthermore, these rulers are usually not wide enough to facilitate the marking and measuring of a square or radial grid patterns used in basting fabric layers, hand-tying quilts, or transferring designs. Typically, the ruler must be turned several directions to mark and check the pattern for size and parallelism. In addition, these rulers have no lines on them to enable the marking of a 30° or 45° radial pattern.

SUMMARY OF THE INVENTION

The present invention provides a measuring device particularly useful for measuring, marking, or cutting materials of various colors, including multicolored material such as quilting fabric. The measuring device includes a sheet of transparent material having one or more composite lines marked on it. Each composite line comprises first and second lines of first and second colors respectively, the first and second colors being different from one another. The first and second lines are mutually parallel, and are positioned with respect to one another such that two different colors appear along the length of each composite line.

Preferably, the first line is superimposed on the second line, with the first line having a lesser breadth than the second line, such that the second line is visible on both sides of the first line. However, the lines may be adjacent each other or at least partially overlapping such that at least two different colors appear along the length of each composite line.

In accordance with further preferred aspects of this invention, the sheet of transparent material is rectangular. The composite lines are positioned on the rectangular sheet to include a first set of one or more mutually parallel composite lines and a second set of one or more mutually parallel composite lines positioned at substantially right angles with respect to one another to thereby form squares. The resulting arrangement of lines and squares forms a grid pattern.

In accordance with still further aspects of this invention, the pattern of composite lines includes angled lines oriented at 30°, 45°, and 60° with respect to either of said first set or second set of mutually parallel composite lines.

In accordance with still further aspects of this invention, each of said first set and second set of mutually parallel composite lines are consecutively numbered. In addition, each of the angled lines are labeled with its respective angular orientation to either of said first set or second set of composite lines.

In accordance with still further aspects of this invention, the first color is yellow and the second color is green. In the alternative, the first color may be white and the second color may be black. A further alternative would have the first color dark orange and the second color light blue. Finally, the first color may be black and the second color may be yellow.

It will be appreciated from the foregoing description that the present invention provides a measuring device in which the two-colored composite lines are easily seen against a multicolored material such as that used in quilting fabric. The measuring device is also of a size to facilitate the marking of grid or radial lines on the fabric layers of a quilt. The transparency facilitates alignment of the measuring device to ensure that the resulting marked lines, patchwork pieces, or transferred designs are accurate and parallel.

DETAILED DESCRIPTION OF THE PREFERRED EMBODIMENT

Figure 1:
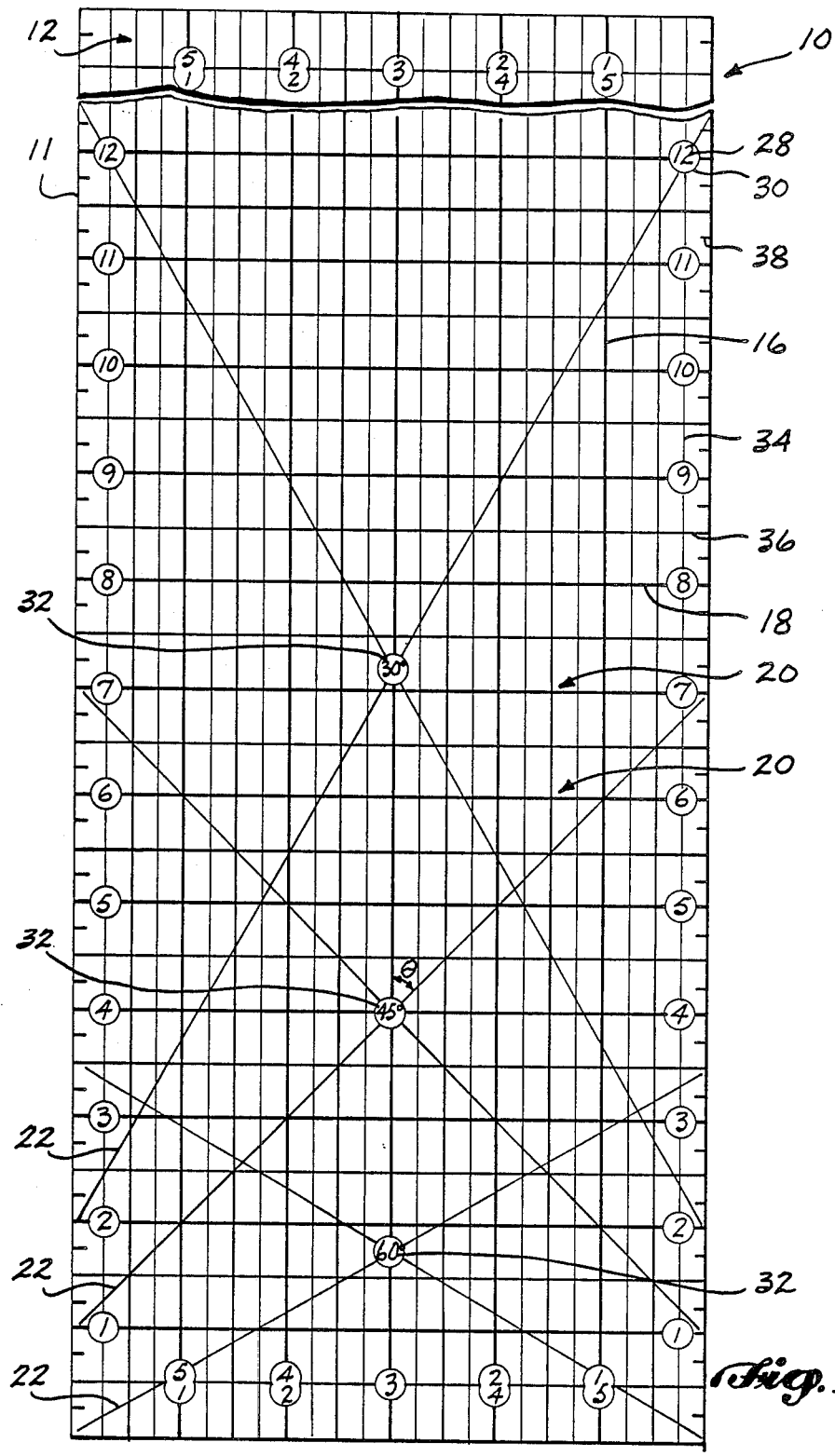
FIG. 1 is a front view of the measuring device formed in accordance with the present invention; and, FIG. 2 is an enlarged view of a portion of the measuring device illustrated in FIG. 1.
Figure 2:
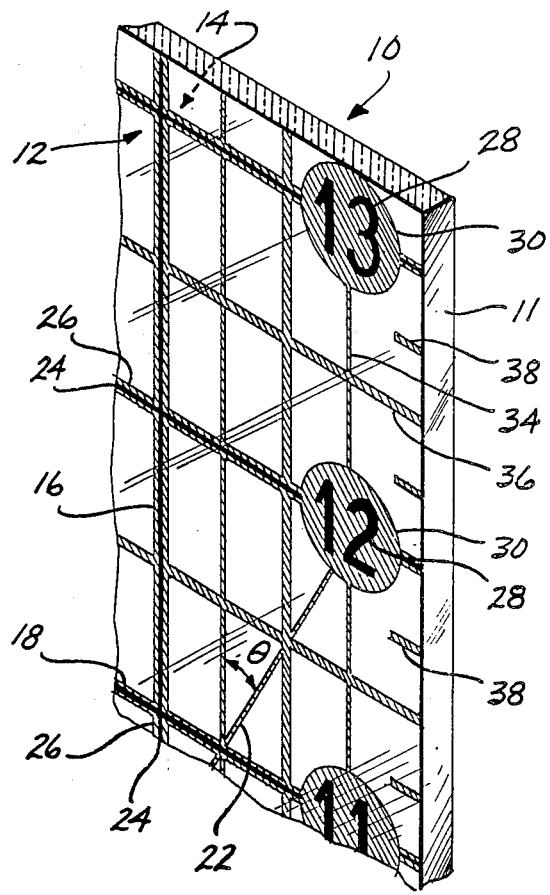

FIGS. 1 and 2 illustrate a preferred embodiment of the measuring device of the present invention. The measuring device 10 comprises a sheet 11 of transparent material having a front surface 12 and a back surface 14. Sheet 11 may be formed from any suitable transparent material such as acrylic plastic. As shown, the measuring device 10 is rectangular, having a preferred length of twenty-four (24) inches and a width of six (6) inches.

A pattern of composite lines is formed on sheet 11, the pattern including a plurality of vertical lines 16 running across the width of the sheet and a plurality of horizontal lines 18 running across the length of the sheet. The vertical lines 16 and the horizontal lines 18 are positioned substantially at right angles with respect to one another to thereby create a grid pattern formed of squares 20. In addition to the horizontal and vertical lines, there are angled lines 22 placed on the grid to form angles of 30°, 45°, and 60°, with either the vertical or horizontal lines. Angled lines 22 enable a user of the measuring device to orient the device at the indicated angles, so that the material can be measured, marked or cut at an angle to a given line.

As is more clearly shown in FIG. 2, each of the horizontal and vertical lines is formed of a first line 24 and a second line 26. The first line 24 is of a first color (or hue) and the second line 26 is of a second color (or hue) that is different from the first color. Preferably, the first line 24 is superimposed upon the second line 26, and the first line 24 is of a lesser breadth than that of the second line 26, such that the second line 26 is visible on each side of the first line 24 when viewed from the front surface 12. However, the first line 24 and the second line 26 may also be placed in adjacent or partially overlapping relationship, so long as the two different colors are visible from the front surface 12. The first and second colors are of a contrasting nature, such as yellow and dark green, white and black, dark orange and light blue, black and yellow, or other combinations such that either one of the colors will be visible against backgrounds of various colors or against a multicolored background.

For ease of illustration, FIG. 2 shows lines 24 and 26 formed on the front surface of measuring device 10. However, it will be understood that the lines could equally well be formed on the back surface of the measuring device, and that such back surface lines would have the advantage of reducing paralax errors. Combinations of front and back surface lines may also be used. Lines 24 and 26 may be formed by any suitable printing process, such as by a silk screen, lithograph press, or photographic process, by an engraving process such as laser engraving, or by combinations of the above techniques.

In the illustrated embodiment, each horizontal and vertical line is consecutively numbered by numbers 28 placed at each line. The numbers 28 are preferably of the first color and are placed in an enlarged circle 30 preferably of the second color. As illustrated herein, the numbers 28 correspond to the distance of each line from an edge of the grid, preferably in inches, although other units may be used. In addition, angled lines 22 have markings 32 representing the angle in degrees that each angled line 22 makes with the vertical lines 16 as measured at angles θ.

Preferably, the squares 20 are further subdivided by vertical subdivision lines 34 and horizontal subdivision lines 36 placed between the vertical lines 16 and the horizontal lines 18. In addition, subdivision marks 38 are shown placed along the length of the measuring device 10 and on the edges thereof.

While preferred embodiments of the invention have been illustrated and described, it will be appreciated that various changes can be made without departing from the sprit and scope of the invention. For example, each of the lines may be placed on the front surface of the measuring device instead of the rear surface. The angled lines and/or the subdivision lines may also consist of two colors, or the composite lines could be curved or could comprise hash marks, cross hairs, or the like. Consequently, the invention can be practiced otherwise than as specifically described herein.

The embodiments of the invention in which an exclusive property or privilege is claimed are defined as follows:

1. A measuring device particularly useful for measuring, marking, or cutting a material such as quilting fabric, the measuring device comprising:
   (a) a sheet of transparent material;
   (b) one or more composite lines marked on the sheet, each composite line comprising first and second lines of first and second colors respectively, the first and second colors being different from one another; and,
   (c) the first and second lines being mutually parallel, and being positioned with respect to one another such that two different colors appear along the length of each composite line.

2. The measuring device of claim 1, wherein said first line is at least partially overlapping on said second line.

3. The measuring device of claim 2, wherein said first line is superimposed on said second line, said first line having a lesser breadth than said second line, such that said second line is visible on both sides of said first line.

4. The measuring device of claim 1, wherein said first and second lines are positioned adjacent one another.

5. The measuring device of claim 4, wherein said sheet of transparent material is rectangular.

6. The measuring device of claim 5, comprising a first set of one or more mutually parallel composite lines and a second set of one or more mutually parallel composite lines, the first set being positioned substantially at right angles to the second set to thereby form squares on said sheet of transparent material.

7. The measuring device of claim 6, further comprising angled composite lines oriented at 30°, 45°, and 60°, with respect to either of said first set or said second set of mutually parallel composite lines.

8. The measuring device of claim 6, wheein said first set and said second set of mutually parallel composite lines are consecutively numbered.

9. The measuring device of claim 1, wherein said first color is yellow and said second color is green.

10. The measuring device of claim 1, wherein said first color is white and said second color is black.

11. The measuring device of claim 1, wherein said first color is dark orange and said second color is light blue.

12. The measuring device of claim 1, wherein said first color is black and said second color is yellow.

* * * * *